July 19, 1932.  J. N. KIEP  1,868,146
HYDRAULIC COUPLING
Filed July 7, 1931    2 Sheets-Sheet 1

INVENTOR
Johann N. Kiep.
BY
ATTORNEYS

July 19, 1932. J. N. KIEP 1,868,146
HYDRAULIC COUPLING
Filed July 7, 1931 2 Sheets-Sheet 2
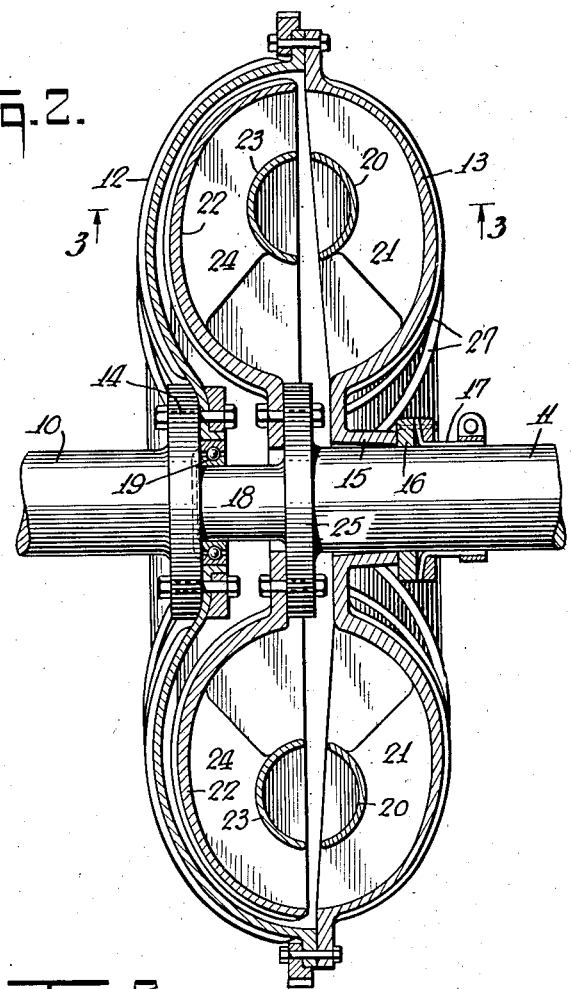
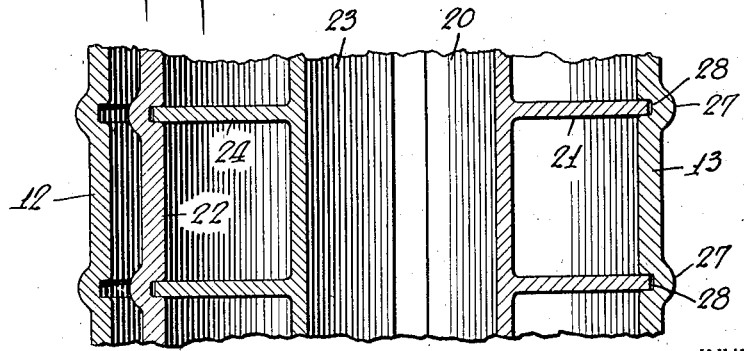
INVENTOR
Johann N. Kiep
BY
ATTORNEYS Patented July 19, 1932

1,868,146

UNITED STATES PATENT OFFICE

JOHANN NIKOLAUS KIEP, OF ALTONA-HOCHKAMP, GERMANY

HYDRAULIC COUPLING

Application filed July 7, 1931. Serial No. 549,306.

The invention relates to the Vulcan type of hydraulic power transmitter or fluid clutch, in which a pair of driving and driven operating members are each provided with an annular series of vanes or blades, and the two members are so designed and so juxtaposed, that the impelling liquid while traveling in the operating circuit defined by said vanes or blades, effects the rotation of the driven member, in response to the rotation of the driving member. Each of these operating members generally includes a dished casing and a core or guide ring interconnected by the series of vanes. A construction of this general character is shown and broadly claimed in the Föttinger Patent No. 1,199,-359, of September 26, 1916.

If these operating members be cast as an integral unit the walls are necessarily thick and heavy and this casting operation involves considerable difficulty and expense. If the parts be made separately from sheet metal stampings or die castings, considerable expense and difficulty is involved in the assembly and rigid connection of the various parts.

One object of the present invention is to provide a new and improved hydraulic coupling which permits the use of light thin material, has great stiffness against distortion under centrifugal stresses, and which is comparatively inexpensive to manufacture.

In carrying out my invention one or both of the walls defining the working circuit is formed of thin material, stamped or die cast to provide a plurality of radially extending, outwardly facing beads or ridges, and inwardly facing grooves which may receive, position and retain the vanes or blades of the member. After assembly, the sides of the grooves may be pinched together to firmly engage and hold the parts assembled.

The radial corrugations not only serve to form grooves for the reception of the vanes, but also serve as heat radiating projections and as reinforcing ribs to impart rigidity or stiffness to the casing and to effectively resist the centrifugal and torsional stresses of the coupling.

In the accompanying drawings, there is shown, for purposes of illustration, one form of a device embodying the invention, in which:

Fig. 2 is a section taken along the axis of rotation of the coupling shown in Fig. 1.

Fig. 3 is a section taken on the line 3—3 of Fig. 2, but on a larger scale, and

Figure 1:
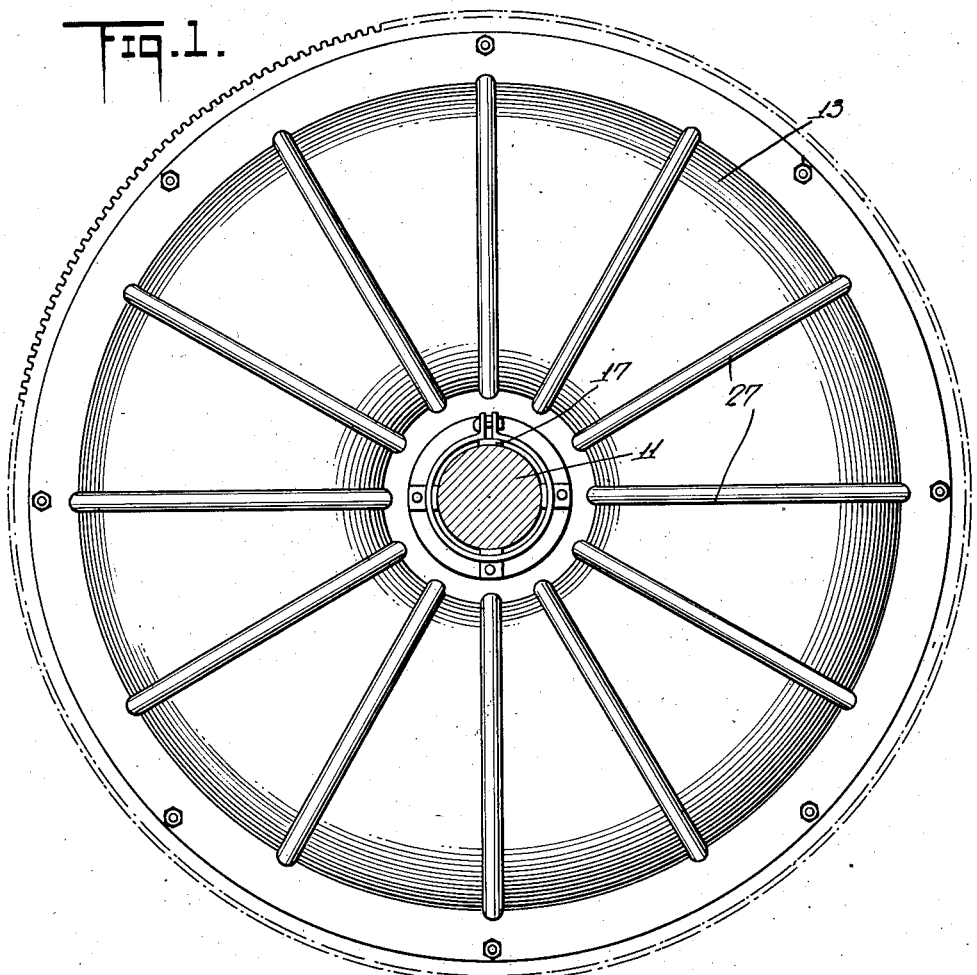
Fig. 1 is a side elevation showing a specific embodiment of the invention.
Figure 4:
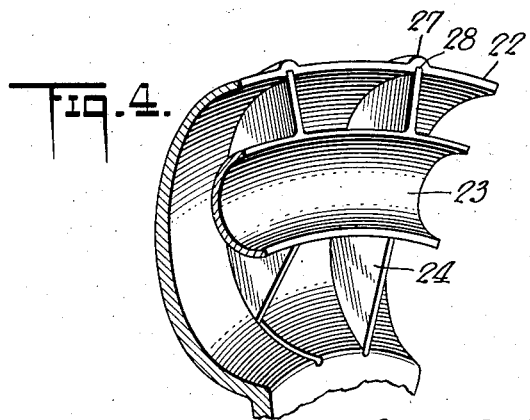
Fig. 4 is a perspective view showing details of a portion of one of the operating members of the coupling.

In the specific construction shown there is provided a pair of aligned shafts 10 and 11, one of which 10 may be the driving shaft and the other 11 the driven shaft. Secured to the driving shaft 10 is a centrifugal pump impeller or driving operating member, including a casing having two dished rings or casting halves 12 and 13 secured together at the periphery.

The casing section 12 may be rigidly bolted to a flange 14 on the shaft 10, while the casing section 13 may encircle the shaft 11 and form a liquid tight joint therewith by being provided with a cylindrical integral collar or sleeve 15 having its end engaging a packing ring 16 pressed axially by spring members 17 clamped to the shaft. The shaft 11 may have a spindle end 18 supported and centered by a ball bearing 19 engaging the flange 14 of the shaft 10 and held in place by the inner clamped edge of the casing section 12.

Cooperating with the casing section 13 is a core ring section 20 connected thereto and spaced therefrom by vanes or blades 21. Thus the casing itself forms one of the two operating members of the coupling.

Within the casing and rotatable in respect thereto is the other operating member including an outer wall or annular dished ring 22, a core ring section 23, and a series of vanes or blades 24. The two operating members are on opposite sides of a radial transverse plane so that in the vortex ring or operating circuit the fluid passes from the driving member to the driven member in an axial direction at the portion of the circuit at the greatest distance from the axis of rotation and returns from the driven to the driving member also in an axial direction, but in the portion of the circuit closest to the axis of rotation. The wall or dished casing section 22 is secured to the shaft in any suitable manner as for instance by being bolted to a flange 25 on the shaft 11. So far as concerns the present invention, either shaft and the parts connected thereto may be considered as the driving part and the other the driven.

In carrying out my invention the members 13 and 22 which form the casing defining the outer limits of the path of the operating circuit or the wall of the operating chamber are formed of thin metal stamped or die cast to the desired shape and provided with radial corrugations which form outwardly facing beads 27 and inwardly facing grooves 28. The vanes 21 and 24 may be die cast integral with their corresponding core ring sections 20 and 23 or may be secured thereto in any suitable manner and the grooves 28 are so positioned that they receive the outer edges of the vanes as the parts of each member are assembled. The grooves are of such depth that when the vanes are positioned therein, the sides of the beads may be crimped or pressed together to grip the vanes and hold the parts together. Additional retaining means may be employed if desired, such as spot welding.

The casing section 12 is preferably formed with radial grooves and beads the same as the members 13 and 22, but obviously these grooves do not receive any vanes.

The corrugations give great strength against centrifugal and torsional stresses while permitting the use of thin light material. The beads radiate the heat resulting from the slip and power losses within the coupling. The thin walls have low specific heat. The grooves insure accurate positioning and spacing of the vanes and resist lateral strains on the vanes and the assembling and crimping of the grooves on the vanes may be by an inexpensive and single press operation.

Certain but not all of these advantages may be secured by making the corrugations in the inner walls, that is the core walls, instead of in the outer walls of the operating chamber.

It will be noted that the casing section 12 serves to transmit the lower from the driving shaft to the blades of the driven member. The corrugations in this member serve not only to resist torsional stresses developed in said driving and to radiate heat, but they also stiffen the member in radial directions so that the casing will hold its shape even when subjected to the high strains of centrifugal force and the high pressure of the liquid when the device is running at high speed. Furthermore the grooves on the inner side of the member 12 opposed to the beads on the outer surface of the member 22 give a considerable amount of drag on the liquid and aid in the rotation of the driven member when the driving member is rotating.

Having thus described my invention, what I claim as new and desire to secure by Letters Patent is:

1. A hydraulic coupling of the Föttinger type, including driving and driven members conjointly defining a fluid operation circuit, each of said members including spaced walls and intervening vanes, one of said walls having a plurality of radial corrugations presenting grooves on the inside, receiving and circumferentially spacing said vanes.

2. A hydraulic coupling of the Föttinger type, including driving and driven members conjointly defining a fluid operating circuit, each of said members including spaced walls and intervening vanes, one of said walls having a plurality of radial corrugations presenting grooves on the inside, receiving and circumferentially spacing said vanes, said corrugations being pinched to firmly engage said blades.

3. A hydraulic coupling including driving and driven members conjointly defining a fluid operating circuit, each of said members including an outer annular dished thin metal wall having a plurality of radially extending corrugations presenting grooves on the inside, a core ring section, and a plurality of impeller blades having their inside radial edges connected to said core ring section, and their outside radial edges firmly engaged in said grooves.

4. A hydraulic coupling including driving and driven members conjointly defining a fluid operating circuit, each of said members including an outer annular dished thin metal wall having a plurality of radially extending corrugations presenting grooves on the inside, a core ring section, and a plurality of impeller blades having their inside radial edges cast integral with said core ring section, and their outside radial edges firmly engaged in said grooves.

5. A hydraulic coupling of the Föttinger type, including driving and driven members conjointly defining a fluid operating circuit, and each including spaced walls and intervening vanes, the outer wall being constructed of thin metal of dished shape with a plurality of corrugations forming ribs on one side and corresponding grooves on the other extending in directions having radial components, said corrugations serving to resist torsional stresses and said ribs serving to radiate heat developed by slippage and power losses.

6. A hydraulic coupling of the Föttinger type, including a casing having a pair of opposed dished discs secured together at their peripheries and each formed of thin metal provided with radial corrugations presenting inwardly facing grooves and outwardly facing beads, a member within said casing and rotatable in respect thereto and having a series of blades, and blades secured in the grooves of said casing and coacting with the blades of said member to define liquid circuits, the corrugations of said casing serving to give rigidity to the casing against circumferential forces, the pressure of liquid within said casing and torsional strains, and also serving to radiate heat resulting from relative slippage of said casing and member.

7. A hydraulic coupling of the Föttinger type, including driving and driven members conjointly defining a fluid operating circuit, each of said members including an outer casing wall of thin sheet metal, an inner core member, and a series of connecting vanes, each of said casing walls having radial corrugations presenting inwardly facing grooves receiving the outer edges of said vanes to hold the latter in spaced position and prevent relative circumferential movement, and said corrugations presenting outwardly facing ribs serving to reinforce said casing sections against centrifugal and torsional strains.

8. A hydraulic coupling including a driving shaft, a driven shaft, a pair of oppositely disposed dished casings, each having a plurality of ribs on the outside thereof and corresponding grooves on the inside extending in directions having radial components, a plurality of impeller blades having their peripheral edges firmly engaged in said grooves, said casings and impeller blades conjointly defining a fluid operating circuit, a shell connecting one of said shafts to one of said casings and disposed in close proximity to the other casing, said shell being constructed of sheet metal stamped into dish shape, and having a plurality of ribs extending in directions having radial components to resist torsional strains between the shaft and casing connected thereto.

9. A hydraulic coupling including a pair of oppositely disposed dished casings having a plurality of radially extending ribs on the outside thereof and corresponding grooves on the inside, a pair of oppositely disposed core rings, a plurality of impeller blades having their inside radial edges integrally connected to their corresponding core ring, and their peripheral edges firmly engaging in said grooves, said ribs being pinched to firmly engage said blades, a shell connected to one of said casings and extending in the same general direction, and in close proximity to the other casing, said shell being constructed of sheet metal and having a plurality of corrugations extending in directions having radial components to radiate heat and strengthen the shell against torsional strains.

Signed at Hamburg, Germany, this 24th day of June, A. D. 1931.

JOHANN NIKOLAUS KIEP.

CERTIFICATE OF CORRECTION.

Patent No. 1,868,146.   July 19, 1932.

JOHANN NIKOLAUS KIEP.

It is hereby certified that error appears in the printed specification of the above numbered patent requiring correction as follows: Page 2, line 53, for "lower" read power; and that the said Letters Patent should be read with this correction therein that the same may conform to the record of the case in the Patent Office.

Signed and sealed this 18th day of August, A. D. 1936.

(Seal)

Henry Van Arsdale
Acting Commissioner of Patents.